United States Patent
Kleinmeyer et al.

(10) Patent No.: US 6,641,773 B2
(45) Date of Patent: Nov. 4, 2003

(54) ELECTRO SPINNING OF SUBMICRON DIAMETER POLYMER FILAMENTS

(75) Inventors: James Kleinmeyer, Abingdon, MD (US); Joseph Deitzel, Abingdon, MD (US); James Hirvonen, Havre de Grace, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 317 days.

(21) Appl. No.: 09/757,272

(22) Filed: Jan. 10, 2001

(65) Prior Publication Data

US 2002/0089094 A1 Jul. 11, 2002

(51) Int. Cl.⁷ .................. D01D 5/12; D06M 10/00; H05B 7/00
(52) U.S. Cl. ............ 264/452; 264/210.8; 264/211.12; 264/465
(58) Field of Search ................ 264/210.8, 211.12, 264/452, 465

(56) References Cited

U.S. PATENT DOCUMENTS

| | | | | | |
|---|---|---|---|---|---|
| 1,975,504 A | * | 10/1934 | Formhals | ........ | 264/10 |
| 2,158,416 A | * | 5/1939 | Formhals | ........ | 264/10 |
| 2,323,025 A | * | 6/1943 | Formhals | ........ | 264/10 |

\* cited by examiner

*Primary Examiner*—Leo B. Tentoni
(74) *Attorney, Agent, or Firm*—Paul S. Clohan, Jr.; Edward L. Stolarun

(57) ABSTRACT

An electro spinning process yields uniform, nanometer diameter polymer filaments. A thread-forming polymer is extruded through an anodically biased die orifice and drawn through an anodically biased electrostatic field. A continuous polymer filament is collected on a grounded collector. The polymer filament is linearly oriented and highly uniform in quality. The filament is particularly useful for weaving body armor, for chemical/biological protective clothing, as a biomedical tissue growth support, for fabricating micro sieves and for microelectronics fabrication.

9 Claims, 2 Drawing Sheets

ELECTRO SPINNING OF SUBMICRON DIAMETER POLYMER FILAMENTS

STATEMENT OF GOVERNMENT INTEREST

The invention described herein may be manufactured and used by or for the Government of the United States of America for Governmental purposes without the payment of any royalties thereon or therefore.

BACKGROUND OF THE INVENTION

1. Field of the Invention

The invention relates to a process for spinning a polymer filament. More particularly, the invention relates to a process for forming a polymer filament in an electrostatic charged field provided by plural, spaced electrodes. The invention also relates to a polymer forming apparatus comprising a spinneret.

2. Discussion of the Related Art

The invention relates to a process for the production of polymer filaments, fibers and other very fine polymer extrudates from a thread-forming polymer. A solid polymer is converted to a fluid state so that it will pass under pressure through a fine extrusion die orifice. A continuous liquid phase filament is extruded and drawn though a zone in which solvent evaporation and cooling takes place, causing the filament to solidify and form a continuous, solid filament. The solid filament is collected by means such as a rotating drum, moving belt, water bath, and the like or a combination thereof. In a filament extrusion apparatus, the die orifice is oriented to pass the liquid phase filament directly toward the collection means. This facilitates a linear orientation in the solidifying polymer filament. Drawing and annealing also facilitate the linear orientation of the fiber.

In the electro spinning process, solvent evaporation from the filament, filament cooling or both take place in the zone between the extrusion die and the filament collection means. This zone is biased to maintain an electrostatic field.

The extrusion die and the filament collection means are each electrically conductive. An electric potential difference is maintained between them. In commercial practice the bias is in the range of 5,000 to 15,000 volts, often 5,000 to 10,000 volts. An electro spinning apparatus usually has a positively biased die and a grounded collection means. A positively biased die with a negatively biased collection means has also been used. The polarity necessitates a minimum separation between the die and collection means to prevent arcing across the zone. In this sense, the electrostatic field is elongated or longitudinal between the two conductors. Reference to the elongated or longitudinal electrostatic field is also consistent with the longitudinal orientation of the filament as it is drawn linearly in the electrostatic field.

The polymer filament is drawn from the die orifice to the collection means under the influence of the electrostatic field. As a result, the extruded molten filament is subjected along its length to an electrostatic field. The strength of the electrostatic field decreases exponentially with the distance between the electrodes. Accordingly, the drawing rate from the anodic die to the cathodic drawing means varies along the filament length due to the variation in the electrostatic charge on the filament.

U.S. Pat. Nos. 1,975,504; 2,158,416; and 2,323,025 to A. Formhals disclose a process and apparatus for preparing artificial threads. These pioneer patents disclose the essential elements of the process, including a pair of spaced electrodes. These electrodes produce an electrostatic field through which an extruded filament is drawn. Means is provided for varying the rate of filament collection. The filament is spun into yarn by mechanical spinning means.

SUMMARY OF THE INVENTION

In accordance with the invention, a process is provided for electro spinning a polymer filament, fiber or the like in an electrostatic field created between a biased polymer extrusion die and a collection means.

A thread-forming polymer is liquefied and extruded through a die orifice. The extruded filament is drawn while solidifying, through the electrostatic field. A solid filament is collected on the collection means.

The electrostatic field is sequentially biased along the length of the liquid filament. The polarity of the electrostatic field is the same as that of the die. The extruded filament is exposed to the sequential bias as it solidifies. As a result, the liquid state filament and the resulting solid filament product have a uniform linear molecular orientation longitudinally along the filament. Therefore the solid filament product tends to have a uniform linear molecular orientation.

Solid filaments produced according to the process has physical properties which make them particularly useful for making protective clothing such as chemical and biological protective clothing, light weight personal body armor and the like. The solid filament also has utility in applications in uses such as tissue growth medium, particulate filters and for optical and electronic applications.

DETAILED DESCRIPTION OF THE INVENTION

Figure 1:
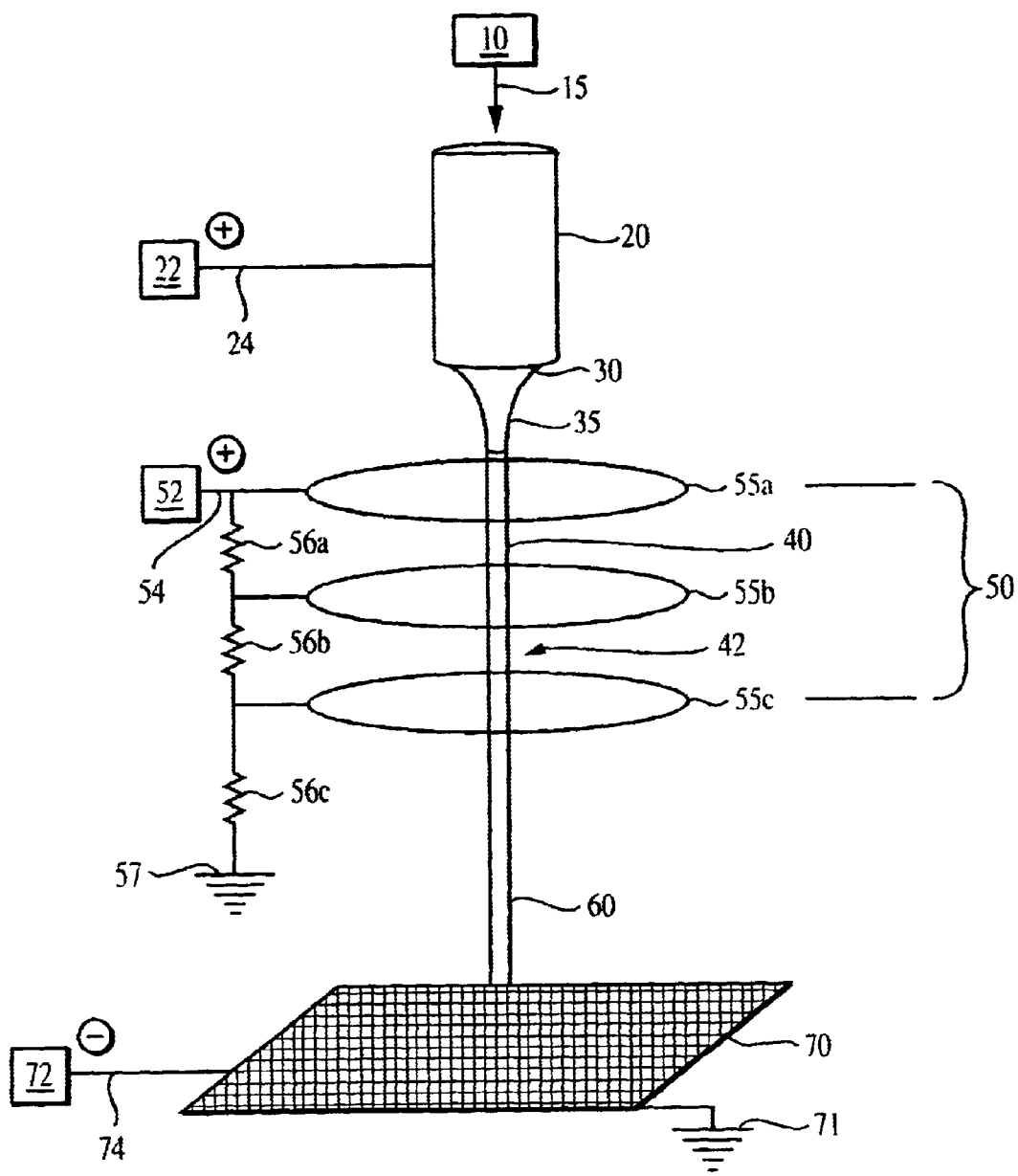
FIG. 1 is a schematic view of an electro spinning spinneret and electrode assembly.

The polymers useful in the electro spinning process include any of the thread-forming polymers known in the art for this utility. These include especially polyamides, polyesters, polyolefins, and polyacrylonitrile. Suitable polyamides are nylon 6, nylon 6/6, nylon 6/9, nylon 6/10, nylon 6/12, nylon 11, nylon 12, copolymers thereof and mixtures thereof. Suitable polyesters are polyalkylene terephthalate and polyalkylene naphthalates, particularly polyethylene terephthalate. Suitable polyolefins are polymers of C2 to C10 olefins, in particular polyethylene, polyoxyethylene, polypropylene and polyoxypropylene and copolymers thereof and mixtures thereof with polymethylmethacrylate.

Solvents useful in the electro spinning process include any of those solvents which are which are effective for use in liquefying thread-forming polymers. The solvent must be stable in the liquid state in mixtures with the polymer at electro spinning process operating temperatures. The solvent must also rapidly evaporate from the surface of the polymer while the polymer is drawn to a thin filament or fiber. Such solvents include acetone, acetic ether, benzene, methyl alcohol, ethyl alcohol, propyl alcohol and the like and mixtures thereof. Water is a particularly useful solvent in the process. Typically, polymer is dissolved in a solvent or combination of solvents in an amount such that the solution passing through the die orifice contains about 1% to 20% by weight thread-forming polymer in solvent and has a viscosity of about 1 to 200 Poise. Electro spinning of a feedstock fluid comprising polymer dissolved in solvent is referred to as electro spinning from solution.

Although less common, melted polymers which display a Melt Index of about 0.5 to 2.0 in the absence of solvent are usable in the process without solvent. Melt Index is measured according to ASTM D-1238, Test Methods for Flow Rates of Thermoplastics by Extrusion Plastometer. Such polymers are heated in the mixer to a temperature, typically in the range of 180° to 350° Centigrade, at which they melt and display the required Melt Index of about 0.5 to 2.0. Electro spinning of a feedstock comprising melted polymer in the absence of solvent is referred to as electro spinning from a molten polymer or polymer melt.

Both electro spinning from solution and electro spinning from molten polymer produce a continuous solid polymer filament of 5 to 1000 nanometers in diameter, preferably 100 to 500 nanometers in diameter.

It is understood that additives such as dyes, pigments, lubricants, nucleating agents, antioxidants, ultraviolet light stabilizers, antistatic agents, soil resistance agents, stain resistance agents anti microbial agents, flame retardants, conductive particles and the like are added to polymer and solvent in the mixer to form a homogenous liquid polymer mixture. The concentration of these additives is chosen according to the desired properties of the final filament, fiber or the like.

Commercial mixers are available for liquefying thread-forming polymer by mixing polymer and solvent together, optionally with controlled heating. Electric stirrers are commonly used for batch mixing. Extruders are used in commercial and laboratory practice for melting and mixing polymer, and any additives and for extruding the thread-forming polymer into a filament, thread or the like.

Inventors adopt the convention herein that the noun "bias" refers to an applied voltage. The verb "bias" means to apply a negative or positive voltage to a body. The word "charge" refers to a definite quantity of electricity, particularly excess or a deficiency of electrons on a body. Furthermore, a bias is applied to the electrodes. This produces an electric field. The electric field induces a charge in the polymer solution. The electric field exerts a force on the induced charge in the polymer solution that causes a conical meniscus to form and to be drawn toward the collecting means.

Attention is drawn to FIG. 1, a schematic diagram of the electro spinning process of the invention. FIG. 1 discloses the essential elements of the inventive method and apparatus for carrying out the invention.

A solid polymer in bead form or reduced to chip form is passed to mixer 10 along with solvent and optional additives. Mechanical mixing may add sufficient heat, or the mechanical heat of mixing may be supplemented by means of electrical heating to achieve the desired viscosity. By way of example the liquefied polymer may comprise 4% to 13% by weight polyoxyethylene polymer having an average molecular weight of about 400,000 dissolved in water. The liquid polymer 15 is passed to a heated die 20. Die 20 is shown here by way of example as a single vertically downward passage capillary having a lower outlet orifice 30 diameter of about 5 to 1,000 nanometers, typically 100 to 500 nanometers. In practice, the die may comprise a plurality of individual capillaries and die orifices. For example, a single die may comprise 5 to 10 capillaries each having a 1–2 millimeter orifice. The die is also provided with means for maintaining the liquefied polymer under sufficient pressure to force the polymer through the die orifices at a rate of about 1 milliliter/hour/die orifice, e.g. 0.5 milliliter/hour/die orifice.

Die 20 is integrally attached to, but electrically isolated from mixer 10. Die 20 is made of electrically conductive material. In the alternative, an electrode may be positioned in contact with the liquefied polymer. A biased electrode positioned in the liquid polymer is the functional equivalent of biasing die 20. It is typical to bias the die by biasing means 22 via anode connector 24 to an electro spinning anodic voltage of 5,000 to 15,000 volts. Of course the voltage applied is variable within the operating range and is selected by methods well known in the art in order to bring the continuous process to a steady state that produces a continuous polymer filament having the desired physical properties. The die has a fixed diameter orifice. It may be replaced with a die of a different fixed diameter orifice. Voltage to the die is adjusted during start-up to yield a continuous filament drawn vertically downward along a linearly elongated path. Process start-up is unsteady state by its nature. However, skilled technicians can start up a process apparatus and bring it to steady state production quickly enough to produce only small amounts of scrap polymer filament. Any scrap is recycled to the mixer.

Vertically 3 to 100 centimeters below the orifice 30 is collecting means 70. Filament collection means 70 may be any apparatus suitable for the purpose of collecting a continuous nanometer diameter filament, such as a rotating drum, a conveyer belt, an electrically biased plate, a biased web, a water bath, and any combination thereof. Collection means 70 is made of electrically conducting material and optionally may be grounded, indicated by ground 71. Alternatively, collection means 70 is biased by biasing means 72 via cathode connector 74. For example, collection means may be cathodically biased to 5,000 to 15,000 volts, e.g. equal and opposite of the bias on die 20. As discussed, the specific bias voltage selected is a matter of process start up and product quality control.

Between the die 20 and the collecting means 70 is, according to the invention, a sequentially biased electrostatic field 50. The electrostatic field may be biased to 10,000 to 300,000 volts/meter. For example, it may be linearly biased to 50,000 to 250,000 volts/meter.

In practice an apparatus may comprise 5 to 10 spinnerets that are spaced 1 to 4 centimeters apart. The filaments are typically spun into yarn. Methods for spinning filaments into yarn are well known in the art. This may be accomplished in the process by increasing the electric potential of the middle one or more rings, e.g. electrode 55b, to cause adjacent filaments to repel and displace laterally from one another. This resolves into a spiraling or corkscrew motion, the functional equivalent of spinning. Electric potential to the following rings is reduced causing the spiraling filaments to converge at a common center. This spinning and recentering is used to spin the filaments into yarn.

In the alternative, the bias of the middle one or more rings can be reduced to induce a small amount of lateral contact between filaments. This also causes spinning of several filaments into yarn. The apparatus used to accomplish spinning provides for independently charged electrodes.

This laterally induced instability can also be used to weave fabric. Weaving is accomplished by means of shaped electrodes. For example, the final two electrodes before collecting means can be parallel plates that direct the filament and control deposition. It is possible to achieve complicated weaving by means of multiple flat plate electrodes, e.g. four flat plate electrodes.

A liquid state polymer in the capillary of die 20 is positively biased by contact with anode connector 24. A meniscus forms at the outlet of the capillary, and is immediately attracted by the cathodic bias on collection means 70 to form a conical meniscus 35 having a hemispherical tip. The term "critical" voltage refers to the electrical potential at which the electrostatic force acting on the liquid surface balances the liquid surface tension. This potential is determined by the physical properties of the polymer liquid, which include surface tension, dielectric constant and viscosity. Once the critical voltage is exceeded, a fine stream of liquid erupts from the apex of the cone. This stream is maintained by a continuous feed of liquid to the capillary outlet at rates less than 1 milliliter/hour/die orifice up to about 10 milliliter/hour/die orifice.

This fine stream of liquid is adjusted by means of the anode voltage to be liquid filament 40. The fine stream of liquid has an initial diameter of 50 to 100 microns on start up. The process yields a continuous solid polymer filament of 5 to 1,000 nanometers in diameter, preferably 100 to 500 nanometers in diameter.

The electrostatic attractive force draws liquid filament 40 to the cathodically biased collecting means 70. As the liquid polymer filament 40 is drawn, it is subjected to solvent evaporation and/or cooling to the ambient temperature, measured by thermocouple 42 at a single point or at multiple points along the filament path. Adjusting ambient pressure and humidity controls the rate of solvent evaporation. Adjusting ambient temperature controls the rate of cooling. As a result of solvent evaporation and/or cooling, the liquid filament 40 solidifies into a solid polymer filament 60.

The linear distance between die 20 and collecting means 70 is 0.5 to 1,000 centimeters or more, e.g. 20 centimeters. Criticality has been found in this linear distance. It has been found at linear distances of about 3 centimeters and greater, that the path of the fiber deviates from straight. Often the deviation is in a generally circular or spiral path. In a first case where the liquid filament 40 spirals, it can break into discontinuous fibers. This is undesirable if a continuous filament is required.

In a second case of filament spiraling, a non-linear bias can be imparted to the filament. This case may in fact be desirable for fibers wherein a natural wool-like crimp is sought, such as in the manufacture of thread for weaving cloth for clothing and the like. However, a non-linear bias is undesirable for some other applications, such as fine very fine mesh woven cloth.

The reason for this path variation is under investigation. The nanometer diameter fibers produced are so fine that they are influence by small transient changes in physical and/or electrostatic forces. Drawing and annealing impart a linear orientation to the fiber. In industrial practice the fiber is collected on a rotating drum that by design has a rotational velocity greater than the velocity of the fiber leaving the die. The rate of drawing is controlled by adjusting the velocity differential between the fiber and the rotating drum. Any small change in this velocity differential influences the acceleration of a filament increment and the degree of linear orientation of that increment.

It is also known that between the anode and the cathode, the attractive force on the molten polymer filament decreases exponentially with the linear distance between the two. This nonlinear relationship is represented as curve 85 on FIG. 2. It is theorized that at a certain distance, the attractive drawing force on the filament is so reduced that electrical charges on the lateral surface are no longer insignificant and the charges begin to hunt an alternate ground, pulling the filament laterally with them. It is known that the attractive electrical force between the biased die and the biased collecting means causes the liquid polymer at the tip of the capillary to distort into a conical liquid polymer meniscus having a hemispherical tip. The fine liquid filament is drawn from this tip. It is thought that repulsive charge forces in the capillary result in instability or vibration in the conical meniscus resulting in an oscillation in the resulting liquid filament.

Applicants have found that a distance of about 3 centimeters from the die orifice is the point beyond which chaotic or spiraling motion may occur in the filament. All of these observations have lead inventors to conclude that there is insufficient restoring force on the drawn filament for inherent stability to ensure consistent product quality in the electro spinning process.

The liquid filament 40 is passed through a longitudinally sequentially biased electrostatic zone 50. This sequentially biased electrostatic zone 50 overcomes the deficiency in the electrostatic field created in a conventional electro spinning process between the die and the filament collecting means. The polymer filaments are passed though a series of electrostatically biased electrodes 55a, 55b, and 55c. These electrostatically biased electrodes are charged by means of biasing means 52 with a bias having the same polarity as that of the die. Each of electrodes is sequentially biased at a lower voltage than the preceding electrode. This can be accomplished by biasing each with the same biasing means 52 in series, with electrical resistors in the circuit between the biased electrodes in order to step the voltage down. For example resistors 56a, 55b and 56c may each be rated 50 ohms at 30,000 volts. Accordingly, the voltage in electrode 55a is lower than the voltage in die 20. The voltage in electrode 55b is lower than the voltage in electrode 55a. The voltage in electrode 55c is lower than the voltage in electrode 55b.

Although three electrodes are shown, it is understood that a plurality of electrodes and a like number of identical resistors can be assembled to provide a sequentially biased electrostatic zone. For example, if n is the number of electrostatically biased electrodes 55a, 55b, 55c, n can equal 10, 20, 50 or more. The die and collecting means are each counted as electrodes. The total number of electrodes in the electro spinning apparatus is then n+2.

The die is counted as the first electrode to which is applied the first electrical charge. The first ring in the electrode means is counted as the second electrode to which is applied the second electrical charge. The last ring in the electrode means is counted as the $(n+1)^{th}$ electrode to which is applied the $(n+1)^{th}$ charge. The $(n+1)^{th}$ ring will usually be in electrical communication with ground, indicated by ground 57, via resistor 56c. The collecting means is the $(n+2)^{th}$ electrode to which is applied the $(n+2)^{th}$ charge. In industrial practice the $(n+2)^{th}$ bias will usually be ground as indicated by ground 71.

Electrostatic zone 50 can be biased by means of a number, n, of electrodes to provide an essentially linearly biased electrostatic zone 50 between die 20 and collecting means 70. The electrodes are usually uniformly spaced, i.e. there is an equal distance between electrodes. The zone 50 should sufficiently fill the space between die 20 and collecting means 70 to that liquid polymer 40 is exposed to a sequentially biased zone. Once solidified, the polymer molecules retain their linear orientation. The resulting solidified filament retains a linear bias.

Solidifying of the liquid filament takes place primarily due to solvent loss, and is also due to cooling, or a combination of the two as the filament passes from the die orifice 30 through electrostatic field 50.

Figure 2:
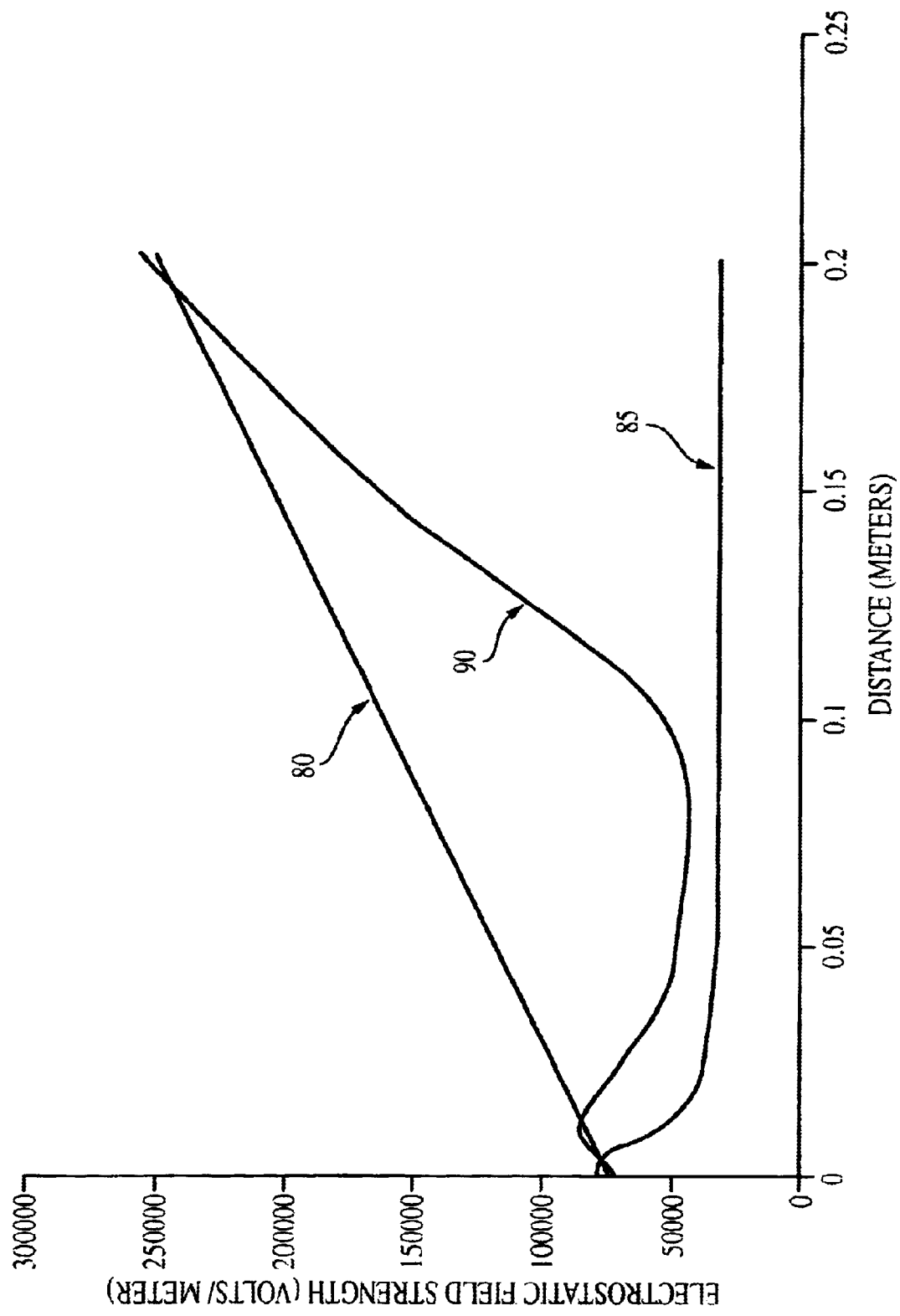
FIG. 2 is a graphical representation of electrostatic field strength with respect to distance from the die orifice to the collecting means.

Attention is drawn to FIG. 2, which graphically depicts the bias field from die charging means 22 to collecting means charging means 70. This includes electrostatic zone 50. Length from tip to target is plotted on the ordinate in meters. Field strength is plotted on the abscissa in volts/meter. Die 20 is at distance 0 meters. Collecting Means 70 is at distance 0.2 meters. The bias applied by electrode means provides an essentially linear voltage gradient, represented by line 80. The gradient in an electro spinning process of the prior art is represented by curve 85.

The charged polymer filament can be deposited directly on collecting means. In the alternative, the solid filament can be passed between parallel plate electrodes. By adjusting the electric potential drop between the plates, it is possible to move the filament laterally. If a second set of parallel plate electrodes is positioned orthogonal to the first set of electrode plates, the fiber can be selectively positioned in two dimensions on a collecting means.

Table of Elements in the Drawing

10 Mixer
15 Molten polymer mixture
20 Die
22 Die biasing means
24 Anode
30 Die orifice
35 Conical meniscus
40 Liquid filament
42 Thermocouple
50 Sequentially biased electrostatic field
52 Electrostatic field biasing means
54 Anode connector
55a, b, c Electrostatically biased electrodes
56a, b, c Resistors
57 Electrostatic field biasing means ground
60 Polymer filament
70 Collecting means
71 Collecting means ground
72 Collecting means biasing means
74 Cathode connector
80 Linear voltage gradient line
85 Non-linear voltage gradient curve
90 Voltage gradient curve of Example 1

This invention is shown by way of Example.

EXAMPLE 1

An electro spinning apparatus was assembled according to the invention. Polyoxyethylene and water were mixed to form a homogeneous aqueous polymer fluid. The die was biased to a positive 7,000 volts. A positive bias of 5,000 volts was applied to the eight ring electrode means. The resulting electric field gradient is represented by line 90 in FIG. 2. An aluminum foil collection surface was biased at negative 10,000 volts. The liquid polymer was drawn vertically downward through the center of the eight ring electrode means over a distance of 8 inches (20.3 centimeters). The filament was photographed by means of high-speed laser imaging. A uniform filament was produced having a maximum diameter of 300 nanometers measured by electron microscopy.

EXAMPLE 2

Voltage to the eight ring electrode means was reduced to 2,500 volts. The liquid polymer filament became unstable, and developed corkscrew path of travel between the die and the collector. The filament was again photographed.

Voltage to the electrode means was then increased to 5,000 volts. The corkscrew path instability damped out and a linear filament was reestablished.

The foregoing discussion discloses and describes embodiments of the present invention by way of example. One skilled in the art will readily recognize from this discussion and from the accompanying drawings and claims, that various changes, modifications and variations can be made therein without departing from the spirit and scope of the invention as defined in the following claims.

What is claimed is:

1. An electro spinning process for extruding a thread-forming polymer and drawing between an electrically charged die, having a first electrical bias and a first polarity and an electrically charged collecting means to produce a continuous polymer filament, comprising the steps of:

liquefying the thread-forming polymer and extruding through a die orifice to form a liquid-state filament, drawing the liquid-state filament through a longitudinally sequentially biased electrostatic field having the same polarity as the first polarity, thereby imparting a bias gradient to the liquid-state filament, solidifying the liquid-state filament to form a linearly oriented solid polymer filament, and collecting the solid polymer filament on the collecting means.

2. The electro spinning process of claim 1 wherein the die and electrostatic field are positively biased and the collecting means is negatively biased.

3. The electro spinning process of claim 1 wherein the die and charged electrostatic field are positively biased and the collecting means is grounded.

4. The electro spinning process of claim 1 wherein the longitudinally sequentially biased field gradient has a length of 3 centimeters or more.

5. The electro spinning process of claim 1 wherein the longitudinally sequentially biased field gradient has a length of 3 to 100 centimeters.

6. The electro spinning process of claim 1 wherein the longitudinally sequentially biased field gradient is linearly charged.

7. The electro spinning process of claim 1 wherein the longitudinally sequentially biased field gradient is linearly charged to 10,000 to 300,000 volts/meter.

8. The electro spinning process of claim 1 wherein the longitudinally sequentially biased field gradient is linearly charged to 50,000 to 250,000 volts/meter.

9. The method of claim 1 wherein the polymer filament is extruded to a diameter of 100 to 500 nanometers.

* * * * *